United States Patent
Song et al.

(10) Patent No.: US 12,430,244 B2
(45) Date of Patent: Sep. 30, 2025

(54) MEMORY CONTROLLER FOR CONTROLLING COMMUNICATION WITH HOST AND METHOD OF OPERATING THE SAME

(71) Applicant: SK hynix Inc., Icheon-si (KR)

(72) Inventors: In Sung Song, Icheon-si (KR); Dong Hwan Koo, Icheon-si (KR); Ki Tae Kim, Icheon-si (KR); Chan Sik Kim, Icheon-si (KR); Dong Young Seo, Icheon-si (KR); Woong Sik Shin, Icheon-si (KR); In Ho Jung, Icheon-si (KR); Jae Hoon Heo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 14 days.

(21) Appl. No.: 18/470,054

(22) Filed: Sep. 19, 2023

(65) Prior Publication Data
US 2024/0338314 A1  Oct. 10, 2024

(30) Foreign Application Priority Data

Apr. 10, 2023 (KR) ........................ 10-2023-0046775

(51) Int. Cl.
*G06F 12/02* (2006.01)
*G06F 13/16* (2006.01)

(52) U.S. Cl.
CPC ...... *G06F 12/0253* (2013.01); *G06F 12/0246* (2013.01); *G06F 13/1689* (2013.01)

(58) Field of Classification Search
None
See application file for complete search history.

(56) References Cited

U.S. PATENT DOCUMENTS

| 10,248,327 | B2 | 4/2019 | Kryvaltsevich | |
|---|---|---|---|---|
| 2017/0285945 | A1* | 10/2017 | Kryvaltsevich | ....... G06F 3/0679 |
| 2021/0096760 | A1* | 4/2021 | Cho | ...................... G06F 3/0679 |
| 2021/0132815 | A1* | 5/2021 | Jang | ...................... G06F 3/0608 |
| 2022/0269603 | A1* | 8/2022 | Ravimohan | ......... G06F 12/0261 |

FOREIGN PATENT DOCUMENTS

KR    20160090953 A    8/2016

* cited by examiner

*Primary Examiner* — Edward J Dudek, Jr.
*Assistant Examiner* — Ralph A Verderamo, III
(74) *Attorney, Agent, or Firm* — Perkins Coie LLP

(57) ABSTRACT

The present technology relates to an electronic device. According to the present technology, a memory controller may include a garbage collection controller and a sustain detector. The garbage collection controller may generate garbage collection information including valid page count values of victim memory blocks on which garbage collection is to be performed among a plurality of memory blocks included in a memory device. The sustain detector in communication with the garbage collection controller may generate sustain information indicating whether random write performance for the memory device is in a sustain state in which a random write performance value related to a capability of the random write performance is greater than or equal to a threshold value based on the garbage collection information.

18 Claims, 8 Drawing Sheets

MEMORY CONTROLLER FOR CONTROLLING COMMUNICATION WITH HOST AND METHOD OF OPERATING THE SAME

PRIORITY CLAIM AND CROSS-REFERENCE TO RELATED APPLICATION

This patent document claims priority to and benefits of the Korean patent application number 10-2023-0046775, filed on Apr. 10, 2023, which is incorporated herein by reference in its entirety.

TECHNICAL FIELD

The technology and implementations disclosed in this patent document relate to an electronic device, and more particularly, to a memory controller and a method of operating the same providing information on random write performance.

BACKGROUND

Storage device refers to electronic components that are configured to store data under control of a host device such as a computer or a smartphone. The data storage device may include a memory device in which data is stored and a memory controller controlling the memory device. The memory device is classified into a volatile memory device and a nonvolatile memory device depending on its capability to hold stored data in the absence of power.

The storage device may perform a background operation regardless of a request of a host for garbage collection and wear leveling. The garbage collection is a technique or process for securing an empty block for storing user data by collecting and programming data of a valid page scattered in a source blocks in a target block and erasing the source blocks. The wear leveling is a technique that allows a program-erase operation counts to be distributed over all blocks as much as possible. When a write request is received from the host while the storage device performs the garbage collection, the storage device may perform a write operation according to the write request. The storage device may calculate random write performance while performing the garbage collection, and adjust a response time to the write request of the host according to the random write performance. The storage device may provide information on the random write performance to the host while performing the garbage collection.

SUMMARY

An embodiment of the present disclosure provides a memory controller and a method of operating the same providing information on random write performance.

According to an embodiment of the present disclosure, a memory controller may include a garbage collection controller and a sustain detector. The garbage collection controller may generate garbage collection information including valid page count values of victim memory blocks on which garbage collection is to be performed among a plurality of memory blocks included in a memory device. The sustain detector in communication with the garbage collection controller may generate sustain information indicating whether random write performance for the memory device is in a sustain state in which a random write performance value related to a capability of the random write performance is greater than or equal to a threshold value based on the garbage collection information.

According to an embodiment of the present disclosure, a method of operating a memory controller may include calculating, by the memory controller, valid page count values of victim blocks on which garbage collection is to be performed among a plurality of memory blocks included in a memory device, performing the garbage collection on the victim blocks, generating sustain information indicating whether a random write performance for the memory device is in a sustain state, based on valid page count values of the victim blocks, and providing the sustain information to a host.

According to an embodiment of the present disclosure, a storage device may include a memory device and a memory controller. The memory device may include a plurality of memory blocks, each memory block including a plurality of pages configured to store data. The memory controller in communication with the memory device may select victim blocks on which garbage collection is to be performed among the plurality of memory blocks, calculate valid page count values of the victim blocks, generate sustain information indicating whether random write performance for the plurality of memory blocks is in a sustain state in which a random write performance value related to a capability of the random write performance is greater than or equal to a threshold value based on the valid page count values, and control a response latency of a request received from a host based on the sustain information.

According to the present technology, a memory controller and a method of operating the same providing information on random write performance are provided.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
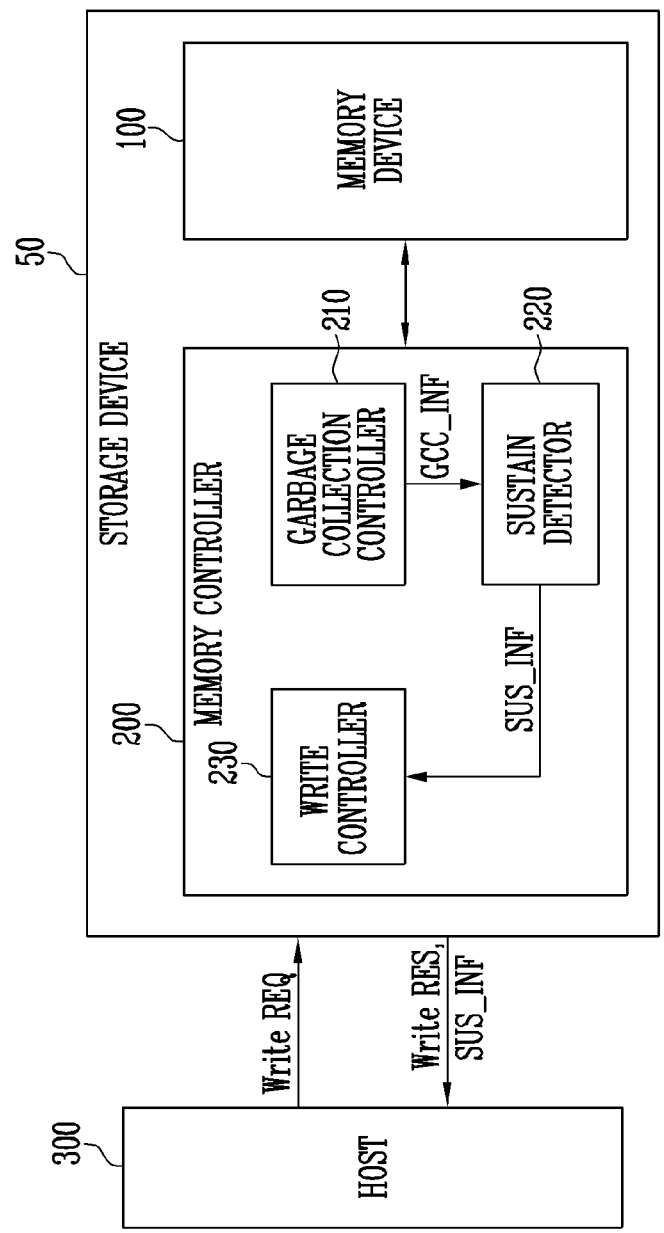
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device 100. The storage device 50 is configured to store data based on a control of a host 300 such as a cellular phone, a smartphone, an MP3 player, a laptop computer, a desktop computer, a game player, a TV, a tablet PC, an in-vehicle infotainment system, or a server.

The storage device 50 may be manufactured as one of various types of storage devices according to a host interface through which the storage device 50 communicates with the host 300. The storage device 50 communicates with the host 300 based on a corresponding communication method depending on the host interface. For example, the storage device 50 may be configured as any one of various types of storage devices such as a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, or a compact flash (CF) card.

The memory device 100 may be configured to store data. The memory device 100 operates based on control of the memory controller 200. The memory device 100 may include a memory cell array including a plurality of memory cells that store data.

The memory cells in the memory cell array may be organized as a plurality of memory blocks. Each memory block may include a plurality of memory cells. One memory block may include a plurality of pages. Thus, the memory device 100 may include a plurality of memory cells for storing data, where the memory cells are organized and grouped to form a plurality of pages of memory cells and the pages of memory cells are organized and grouped to form blocks of memory cells. Each page includes different memory cells and each block includes different pages of memory cells. In an embodiment, the page may be a unit for storing data in the memory device 100 or reading data stored in the memory device 100 so that the memory cells in a page can be programmed or read together.

In an embodiment, the memory block may be a unit for erasing data so that memory cells of a block can be erased together.

The memory device 100 is configured to receive a command and an address from the memory controller 200 and access a memory cell array area corresponding to the received address of the memory cell array. Thus, the memory device 100 may perform an operation instructed by the command on the memory cell array area selected by the address. For example, the memory device 100 may perform a write operation (program operation), a read operation, and an erase operation. During the program operation, the memory device 100 may store data by programming the data to the memory cell array area selected by the address. During the read operation, the memory device 100 may read the stored data from the memory cell array area selected by the address. During the erase operation, the memory device 100 may erase the data stored in the memory cell array area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory blocks included in the memory device 100 in which data is to be stored.

The memory controller 200 may control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide a command such as a program command, a read command, or an erase command for performing background operations such as wear leveling or garbage collection, the address, and the data to the memory device 100.

The host 300 may communicate with the storage device 50 using at least one of various communication methods such as an interface of a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), or a dual in-line memory module (DIMM).

In an embodiment, the memory controller 200 may include a garbage collection controller 210, a sustain detector 220, and a write controller 230.

The garbage collection controller 210 is configured to control the garbage collection and may calculate valid page count values of each of the plurality of memory blocks included in the memory device 100. The garbage collection controller 210 may select victim blocks on which garbage collection is to be performed among the plurality of memory blocks. The garbage collection controller 210 may generate garbage collection information GCC_INF including the valid page count values of the victim blocks.

The garbage collection controller 210 may perform the garbage collection on the victim blocks based on the garbage collection information GCC_INF.

The sustain detector 220 may receive the garbage collection information GCC_INF from the garbage collection controller 210. The sustain detector 220 may generate sustain information SUS_INF indicating whether the memory device 100 is in a sustain state in which a random write performance value related to a capability of the random write performance for the memory device 100 is greater than or equal to a threshold value based on the garbage collection information GCC_INF. The threshold value may be a predetermined value in a manufacturing step of the memory device 100. The random write performance refers to a write scheme that is different from the sequential write performance that writes data sequentially to the memory device 100. The major difference between the sequential and random write schemes is the order in which data is written to the memory device 100. While the sequential write scheme writes data with continuous addresses, the random write scheme writes data to the memory device 100 randomly with discontinuous address. Unlike sequential writing, random write performance jumps back and forth across the memory device 100, creating a scattered data pattern. The random write performance value for the memory device 100 can be in various forms as long as such value provides information on capabilities of the random write performance.

For example, the sustain information SUS_INF may indicate the sustain state in which the garbage collection is being executed and the random write performance is greater than or equal to the threshold value. The sustain state may be a state in which constant performance of random writing for the memory device 100 is guaranteed. The sustain information SUS_INF may indicate a transition state in which the garbage collection is being executed and the random write performance is less than the threshold value. The sustain information SUS_INF may indicate a no transition state in which the garbage collection is not being executed (that is, being off). The sustain detector 220 may provide the sustain information SUS_INF to the host 300. The sustain detector 220 may generate and provide the sustain information SUS_INF to the host 300 whenever the garbage collection is performed.

In an embodiment, the sustain detector 220 may determine whether the memory device 100 is in the sustain state according to whether a check value, which is an average of the valid page count values of the victim blocks, belongs to a preset range. The victim blocks may be memory blocks selected to secure a free block. Valid data stored in the victim blocks may be copied to and stored in a suitable free block, and then the victim blocks may be erased. The sustain detector 220 may determine that the memory device 100 is in the sustain state when the check value is greater than or equal to a first reference value and less than a second reference value as the preset range. The first reference value may be a minimum value of the valid page count values of the victim blocks set in a manufacturing process step to determine whether the memory device 100 is in the sustain state. The second reference value may be a maximum value of the valid page count values of the victim blocks set in the manufacturing process step to determine whether the memory device 100 is in the sustain state.

In an embodiment, the sustain detector 220 may calculate a plurality of check values corresponding to a plurality of respective groups including different numbers of victim blocks. The check value of each of the plurality of groups may be used as a reference for determining the sustain state. In order to more accurately determine the sustain state, the number of victim blocks included in each group may be set differently as a sample size. Each of the plurality of check values may be an average of valid page count values of victim blocks belonging to a corresponding group. At this time, as will be described with reference to FIG. 4, the sustain detector 220 may preferentially allocate a victim block having a valid page count value lower than that of other victim blocks among the victim blocks to the plurality of groups. This is because the garbage collection is required to be performed preferentially for a victim block having a low count value of a valid page, and thus the victim block having the low count value is required to be considered first when determining the sustain state.

The sustain detector 220 may determine whether the memory device 100 is in the sustain state based on the plurality of check values. For example, the sustain detector 220 may determine that the memory device 100 is in the sustain state when a standard deviation of the plurality of check values is less than or equal to a reference deviation. The sustain detector 220 may determine that the memory device 100 is in the sustain state when an error between each of the plurality of check values and the average of the plurality of check values is less than or equal to a reference error. The reference deviation and the reference error may be values experimentally obtained in a manufacturing process step or a test step to determine whether the memory device 100 is in the sustain state.

The write controller 230 may receive a write request Write REQ from the host 300 and control a latency of a write response Write RES to the write request Write REQ based on the sustain information SUS_INF. For example, when the memory device 100 is in the sustain state, the write controller 230 may perform write throttling for delaying the latency of the write response Write REQ. The write controller 230 may reduce a bottleneck phenomenon caused by requests received from the host 300 and improve quality of service (QOS) by intentionally delaying the latency of the write response Write RES.

Figure 2:
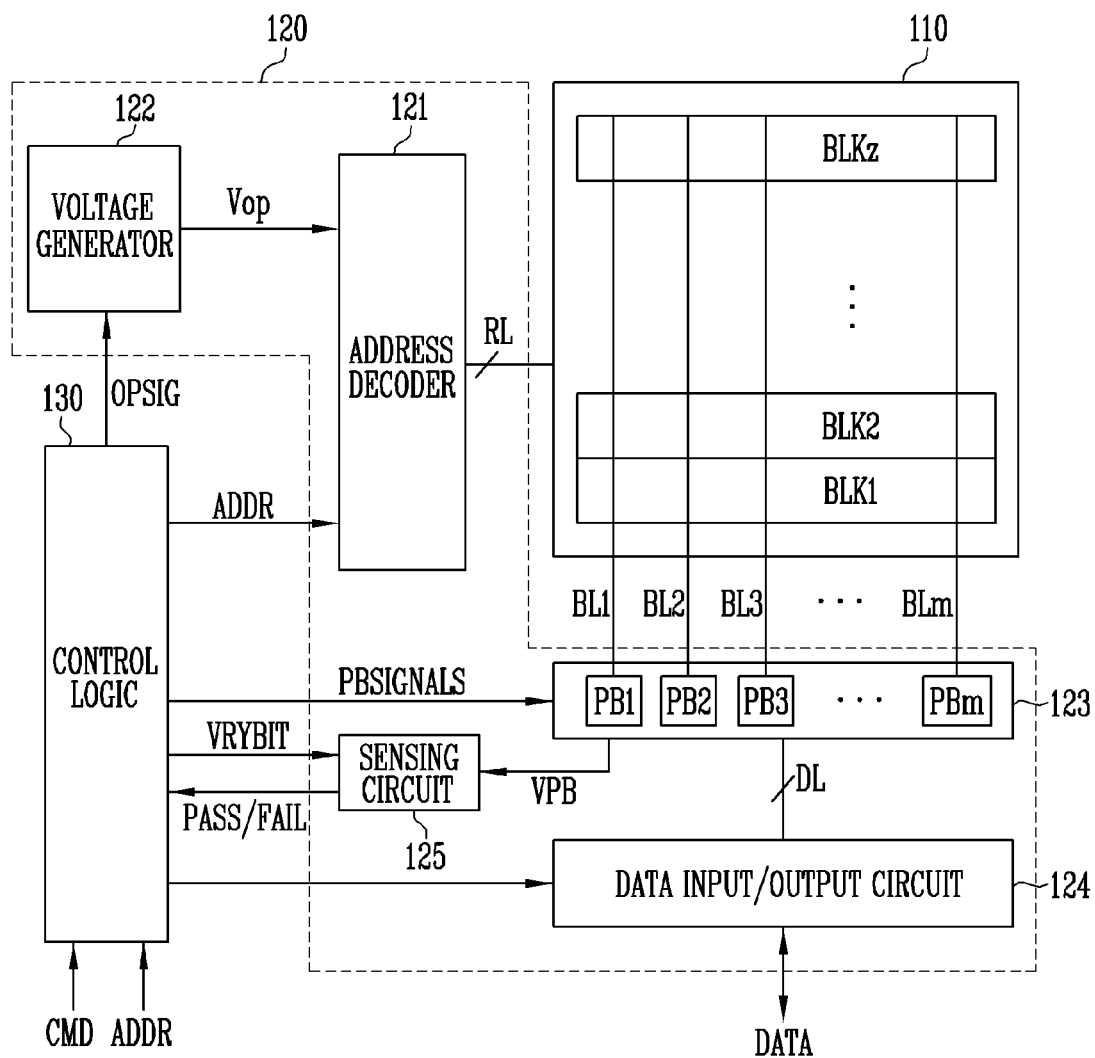
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. As an embodiment, the plurality of memory cells are nonvolatile memory cells. Memory cells connected to the same word line among the plurality of memory cells are defined as one physical page.

Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and may apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines. During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. During the erase operation, the address decoder 121 may apply a ground voltage to the word lines of the selected memory block.

According to an embodiment of the present disclosure, the address decoder 121 may be configured to decode a column address of the received address ADDR. The decoded column address may be transmitted to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

As an embodiment, the voltage generator 122 may generate an internal power voltage by regulating the external power voltage. The internal power voltage generated by the voltage generator 122 is used as an operation voltage of the memory device 100.

As an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data (DATA) with the data input/output circuit 124. At a time of program, the first to m-th page buffers PB1 to PBm receive the data (DATA) to be stored through the data input/output circuit 124 and data lines DL.

During the program operation, when a program voltage is applied to the selected word line, the first to m-th page buffers PB1 to PBm may transmit the data (DATA) received through the data input/output circuit 124 to the selected memory cells through the bit lines BL1 to BLm. The memory cells of the selected page are programmed according to the transmitted data (DATA). A threshold voltage of a memory cell connected to a bit line to which a program permission voltage (for example, a ground voltage) is applied may be increased. A threshold voltage of a memory cell connected to a bit line to which a program inhibition voltage (for example, a power voltage) is applied may be maintained. During the program verify operation, the first to m-th page buffers PB1 to PBm read the data (DATA) stored in the memory cells from the selected memory cells through the bit lines BL1 to BLm.

During the read operation, the read and write circuit 123 may read the data (DATA) from the memory cells of the selected page through the bit lines BL1 to BLm and store the read data (DATA) in the first to m-th page buffers PB1 to PBm.

During the erase operation, the read and write circuit 123 may float the bit lines BL1 to BLm. As an embodiment, the read and write circuit 123 may include a column select circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data (DATA). During the program operation, the data input/output circuit 124 receives the data (DATA) to be stored from an external controller (not shown). During the read operation, the data input/output circuit 124 outputs the data (DATA) transmitted from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transmitted from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write circuit control signal PBSIGNALS to the read and write circuit 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
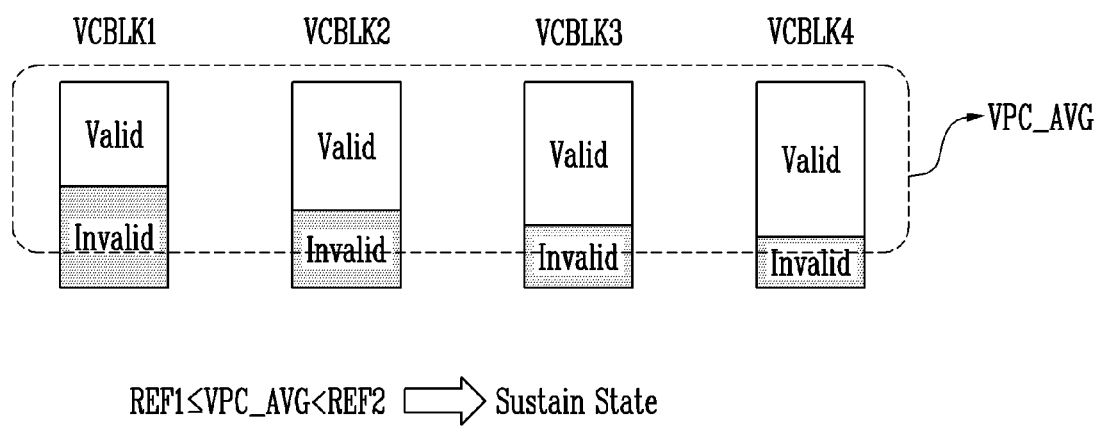
FIG. 3 is a diagram illustrating an operation of detecting a sustain state according to an embodiment.

FIG. 3 is a diagram illustrating an operation of detecting a sustain state according to an embodiment.

In an embodiment, a state of the memory device may be any one of no-transition state, the transition state, and the sustain state. The no-transition state may be a state in which the garbage collection is unnecessary because a free block is available. The transition state may be a state in which the garbage collection is being performed, but the random write performance is not constant due to a large difference between the valid page counts included in the victim block. The sustain state may be a state in which the difference between the valid page counts included in the victim block is within a certain range while the garbage collection is performed and the random write performance is constantly guaranteed. QoS may be improved by appropriately delaying the latency of the response through the write throttling in the sustain state at a necessary time point.

Referring to FIG. 3, whether the memory device is in the sustain state may be determined based on whether a check value VPC_AVG, which is an average of valid page count values of victim blocks VCBLK1 to VCBLK4, falls within a preset range. The number of victim blocks and a valid page count value of each victim block are not limited to the present embodiment.

When the check value VPC_AVG is greater than or equal to a first reference value REF1 and less than a second reference value REF2 as the preset range, the memory device may be determined to be in the sustain state. The first reference value REF1 and the second reference value REF2 may be preset values for determining whether the memory device is in the sustain state. The first reference value REF1 may be a minimum value of the valid page count values of the victim blocks VCBLK1 to VCBLK4 that are counted in the manufacturing process step. The second reference value REF2 may be a maximum value of the valid page count values of the victim blocks VCBLK1 to VCBLK4 that are counted in the manufacturing process step.

Figure 4:
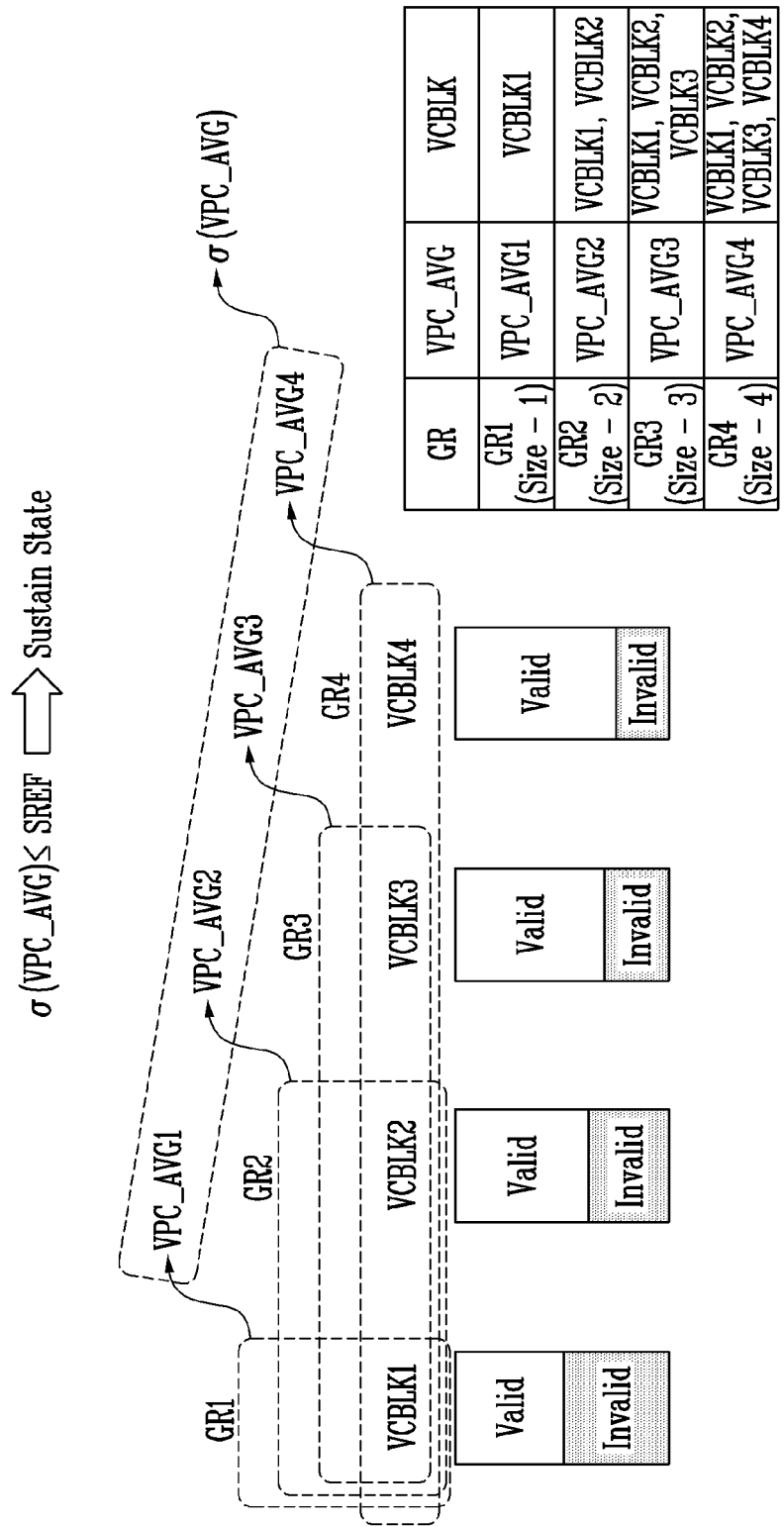
FIG. 4 is a diagram illustrating an operation of detecting a sustain state according to an embodiment.

FIG. 4 is a diagram illustrating an operation of detecting a sustain state according to an embodiment.

Referring to FIG. 4, a plurality of groups GR1 to GR4 may include different numbers of victim blocks. A check value of each of the plurality of groups GR1 to GR4 is utilized as a reference for determining the sustain state of the memory device. Since the number of victim blocks corresponds to a size of samples considered for determining the sustain state of the memory device, the plurality of groups GR1 to GR4 may include different numbers of victim blocks in order to more accurately determine the sustain state. In the implementation, a first group GR1 may include one victim block, a second group GR2 may include two victim blocks, a third group GR3 may include three victim blocks, and a fourth group GR4 may include four victim blocks. The numbers of victim blocks in the first to fourth groups GR1 to GR4 are examples only. The number of victim blocks included in (or allocated to) each group is not limited to the present embodiment. The number of victim blocks included in each group indicate a window size of each group. The window size may correspond to a size of samples considered for calculating a check value of each group.

The victim blocks may be allocated to the plurality of groups GR1 to GR4 based on the valid page count values. Among the victim blocks, the victim block having a valid page count value that is lower than that of another victim block may be preferentially allocated to the plurality of groups GR1 to GR4. For example, the victim blocks having less valid page count value may be allocated more frequently to one or more of the plurality of groups GR1 to GR4. For example, the number of groups to which a particular victim block is allocated is based on the valid page count value of the particular victim block. For example, as the valid page count value of the victim block is lower, the victim block may be allocated to more groups among the plurality of groups GR1 to GR4. A reason why a victim block having a less valid page count value is preferentially allocated is that the victim block having the less valid page count value is required to be considered first when determining the sustain state since the garbage collection is performed first.

For example, a first victim block VCBLK1 having the lowest valid page count value may be allocated to each of all of the first to fourth groups GR1 to GR4. A second victim block VCBLK2 having a second lowest valid page count value may be allocated to the second to fourth groups GR2 to GR4. A third victim block VCBLK3 having a third lowest valid page count value may be allocated to the third and fourth groups GR3 to GR4. A fourth victim block VCVLK4 having a fourth lowest valid page count value (or having the highest valid page count value among the victim blocks) may be allocated to the fourth group GR4.

In an embodiment, a plurality of check values VPC_AVG1 to VPC_AVG4 corresponding to the plurality of respective groups GR1 to GR4 may be calculated. Each of the plurality of check values VPC_AVG1 to VPC_AVG4 may be an average of valid page count values of victim blocks belonging to a corresponding group.

For example, a first check value VPC_AVG1 may be a valid page count value of the victim block VCBLK1 included in the first group GR1. A second check value VPC_AVG2 may be an average of valid page count values of the victim blocks VCBLK1 and VCBLK2 included in the second group GR2. A third check value VPC_AVG3 may be an average of valid page count values of the victim blocks VCBLK1 to VCBLK3 included in the third group GR3. A fourth check value VPC_AVG4 may be an average of valid page count values of the victim blocks VCBLK1 to VCBLK4 included in the fourth group GR4.

When a standard deviation $\sigma$ (VPC_AVG) of the plurality of check values VPC_AVG1 to VPC_AVG4 is less than or equal to a reference deviation SREF, the memory device may be determined to be in the sustain state. The reference deviation SREF may be a value experimentally obtained in the manufacturing process step or the test step to determine whether the memory device 100 is in the sustain state.

In a case of the embodiment described with reference to FIG. 4, since the window size is different for each group, sensitivity in which each check value reflects the average of the valid page count values of the victim blocks may be different. For example, the sensitivity of the check value may be high as the window size of the group is small, and the sensitivity of the check value may be low as the window size of the group is large. Therefore, differently from the embodiment described with reference to FIG. 3, whether the memory device is in the sustain state may be more precisely determined using check values having different sensitivities.

Figure 5:
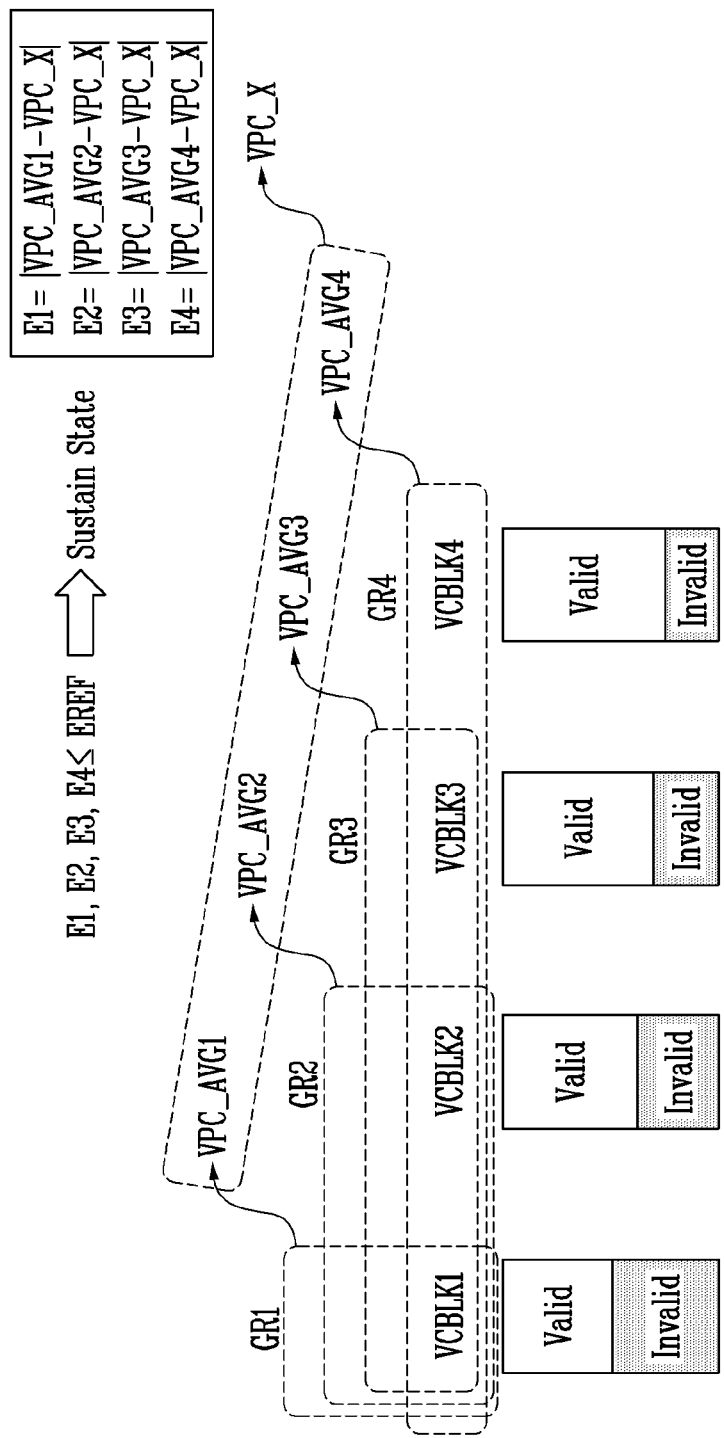
FIG. 5 is a diagram illustrating an operation of detecting a sustain state according to an embodiment.

FIG. 5 is a diagram illustrating an operation of detecting a sustain state according to an embodiment.

Referring to FIGS. 4 and 5, when errors E1 to E4 between each of the plurality of check values VPC_AVG1 to VPC_AVG4 and an average VPC_X of the plurality of check values are less than or equal to a reference error EREF, the memory device may be determined to be in the sustain status. The reference error EREF may be a value experimentally obtained in the manufacturing process step or the test step to determine whether the memory device 100 is in the sustain state.

Figure 6:
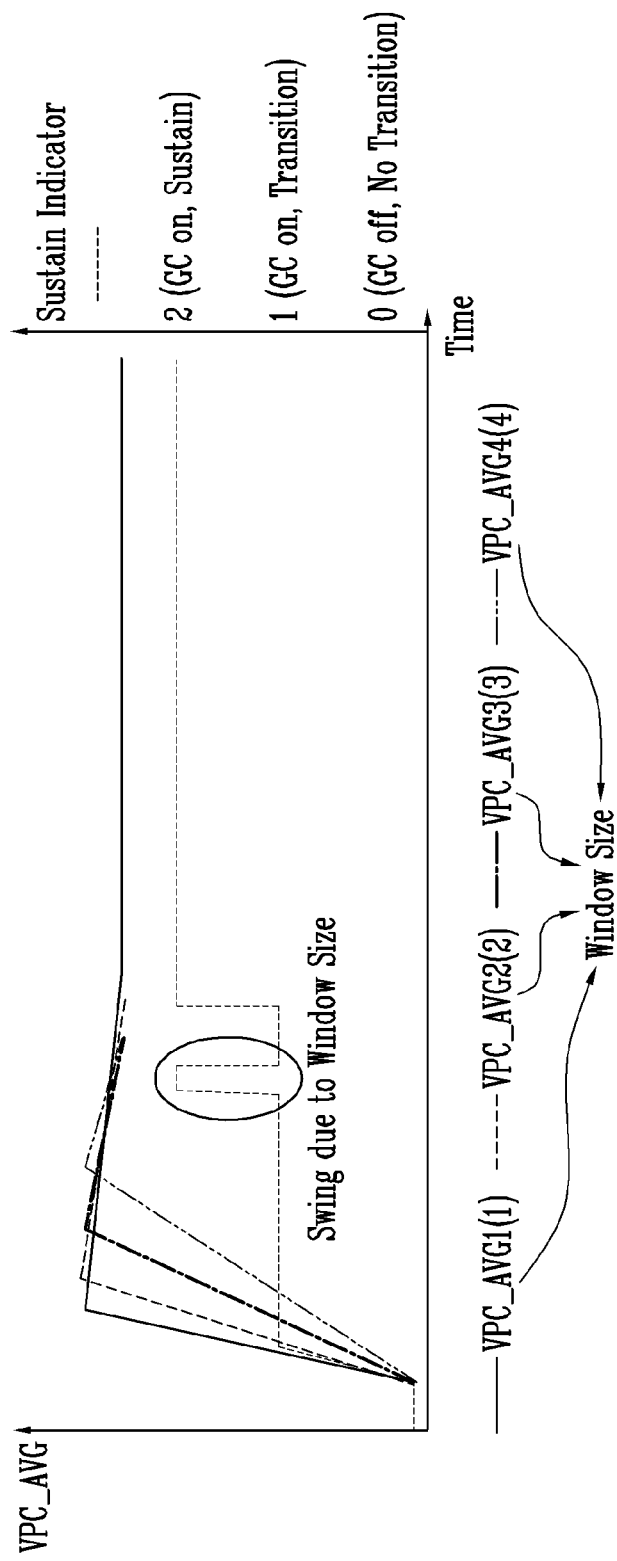
FIG. 6 is a diagram illustrating sustain information.

FIG. 6 is a diagram illustrating the sustain information.

Referring to FIG. 6, the sustain information may indicate whether the memory device is in the sustain state according to a value of a sustain indicator. For example, when the sustain indicator is 2, the sustain information may indicate the sustain state in which the garbage collection is being executed and the random write performance is greater than or equal to the threshold value. When the sustain indicator is 1, the sustain information may indicate the transition state in which the garbage collection is being executed and the random write performance is less than the threshold value. When the sustain indicator is 0, the sustain information may indicate the no transition state in which the garbage collection is not being executed (that is, being off).

In a state in which the check values described with reference to FIG. 4 are 0, that is, before the garbage collection for the victim blocks is performed, the sustain indicator may be 0 and the memory device may be in the no transition state. When the garbage collection for the victim blocks is being performed and before the check values satisfy the sustain determination reference described with reference to FIG. 4 or 5, the sustain indicator may be 1 and the memory device may be in the transition state. When the garbage collection for the victim blocks is being performed and the check values satisfy the sustain determination reference described with reference to FIG. 4 or 5, the sustain indicator may be 2 and the memory device may be in the sustain state.

Since sensitivities of each of the check values (or the window size of the group corresponding to the check value) are different from each other, a temporary swing may occur on the sustain indicator.

Figure 7:
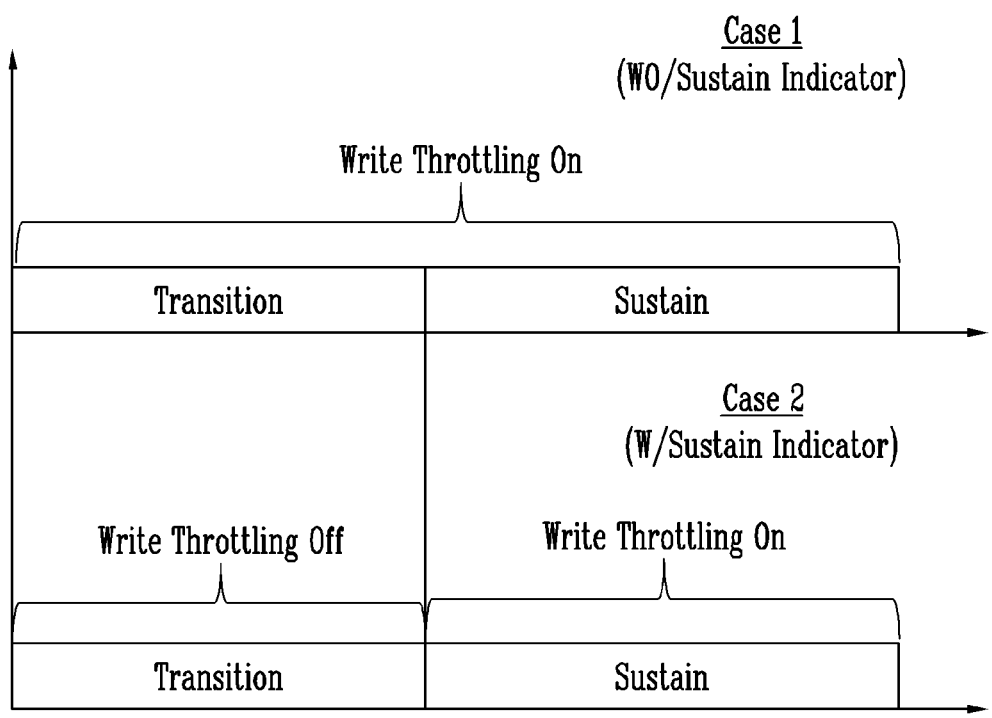
FIG. 7 is a diagram illustrating an operation of controlling write throttling based on the sustain information.

FIG. 7 is a diagram illustrating an operation of controlling write throttling based on the sustain information.

Referring to FIGS. 6 and 7, the memory controller may determine whether the memory device is in the transition state or the sustain state based on the sustain indicator included in the sustain information. The memory controller may determine a time point when the write throttling is performed based on the sustain information. The write throttling may be an operation of intentionally delaying the latency of the response to the write request received from the host to reduce a bottleneck phenomenon caused by processing requests received from the host and improve QoS.

In Case 1, since the sustain information does not exist, the memory controller performs the write throttling when the garbage collection is executed. The transition state is a state in which the random write performance is less than the threshold value and thus the random write performance for the memory device is not constantly guaranteed. In this case, the write throttling for delaying the latency of the response may be unnecessary, and performing the write throttling for the memory device in the transition state may lower QoS.

In Case 2, since the sustain information exists, the memory controller may perform the write throttling in the sustain state in which the garbage collection is executed and the random write performance for the memory device is constantly guaranteed. In this case, the garbage collection is required to be frequently performed since the random write performance is greater than or equal to the threshold value. Therefore, the memory controller may need to appropriately delay the latency of the response by performing the write throttling for the memory device in the sustain state. Performing the write throttle for the memory device in the transition state can delay the latency of the response at a necessary time point, and increase QoS.

In Case 2 as compared to Case 1, the memory controller can improve QoS by internally determining whether the memory device is in the sustain state and performing the write throttling at a more appropriate time point, for example, when the memory device is in the sustain state.

Figure 8:
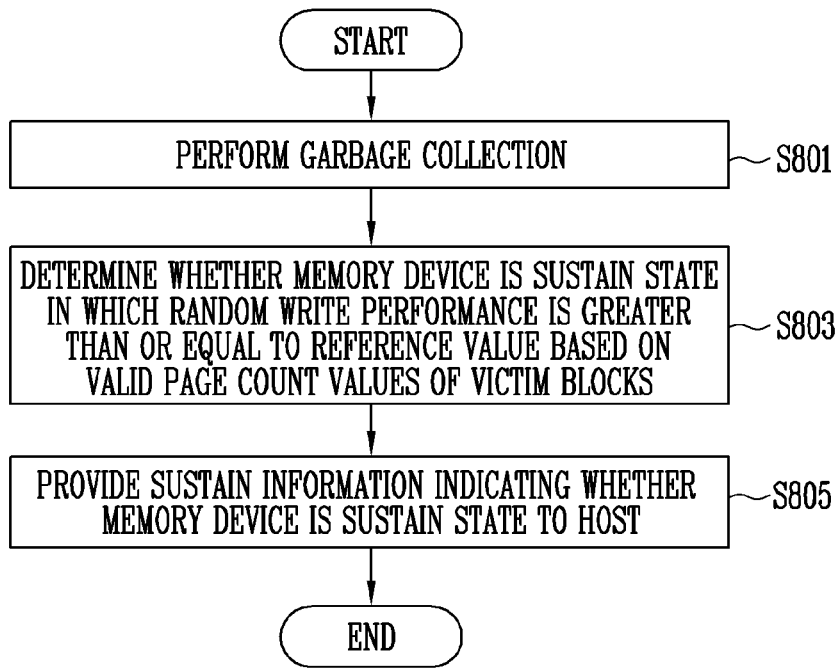
FIG. 8 is a flowchart illustrating an operation of a memory controller according to an embodiment.

FIG. 8 is a flowchart illustrating an operation of a memory controller according to an embodiment.

Referring to FIG. 8, in step S801, the memory controller may perform the garbage collection on the memory device.

In step S803, the memory controller may determine whether the memory device is the sustain state in which the random write performance value for the memory device is greater than or equal to a reference value, based on the valid page count values of the victim blocks. For example, the memory controller may determine that the memory device is in the sustain state when the check value, which is the average of the valid page count values of the victim blocks, falls within the preset range.

In another embodiment, the memory controller may calculate the plurality of check values corresponding to the plurality of respective groups including different numbers of victim blocks. Each of the plurality of check values may be the average of the valid page count values of the victim blocks belonging to the corresponding group. The memory controller may determine that the memory device is in the sustain state when the standard deviation of the plurality of check values is less than or equal to the reference deviation or when the error between each of the plurality of check values and the average of the plurality of check values is less than or equal to the reference error.

In step S805, the memory controller may provide the sustain information indicating whether the memory device is in the sustain state to the host.

Figure 9:
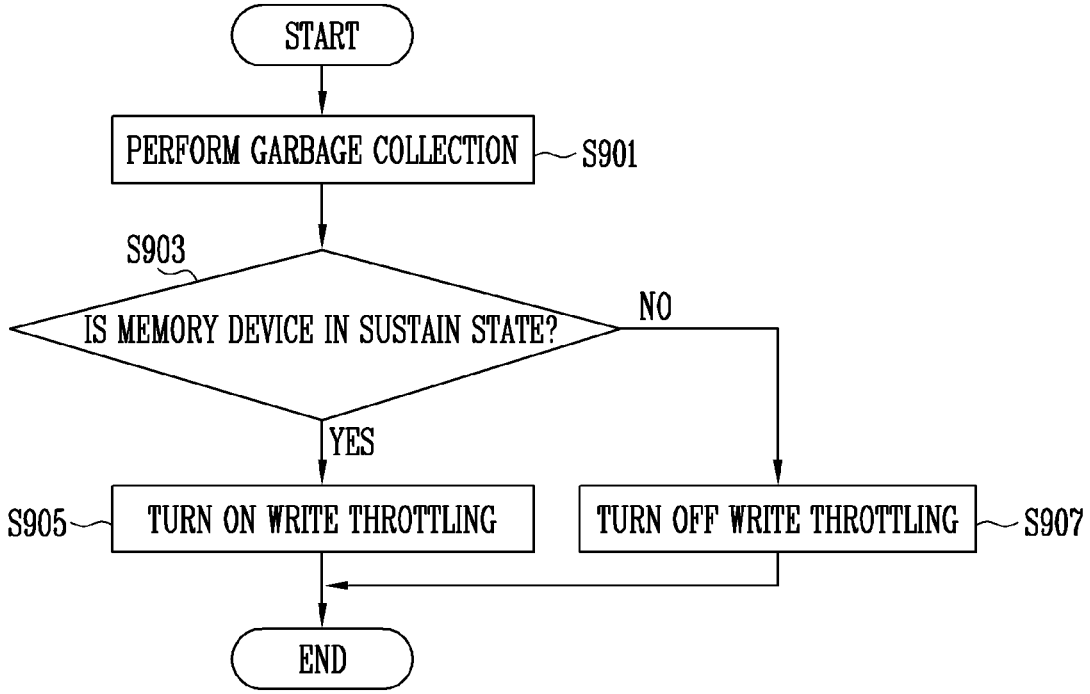
FIG. 9 is a flowchart illustrating an operation of a memory controller according to an embodiment.

FIG. 9 is a flowchart illustrating an operation of a memory controller according to an embodiment.

Referring to FIG. 9, in step S901, the memory controller may perform the garbage collection on the memory device.

In step S903, the memory controller may determine whether the memory device is in the sustain state. As a result of the determination, when the memory device is in the sustain state, the operation proceeds to step S905, and when the memory device is not in the sustain state, that is, in the transition state, the operation proceeds to step S907. The transition state may be a state in which the garbage collection is being performed, but the random write performance is not constant because a difference between the valid page counts included in the victim block is large. The sustain state may be a state in which a difference between the valid page counts included in the victim block is within a certain range while the garbage collection is performed and the random write performance is constantly guaranteed.

In step S905, the memory controller may turn on the write throttling.

In step S907, the memory controller may turn off the write throttling.

In steps S905 and S907, the memory controller may selectively turns on/off the write throttling according to whether the memory device is in the sustain state, thereby appropriately delaying the latency of the response to the write request and Improving QoS.

What is claimed is:

1. A memory controller, comprising:
   a garbage collection controller configured to generate garbage collection information including valid page count values of victim blocks on which garbage collection is to be performed among a plurality of memory blocks included in a memory device;

a sustain detector in communication with the garbage collection controller and configured to generate sustain information indicating whether random write performance for the memory device is in a sustain state in which a random write performance value related to a capability of the random write performance is greater than or equal to a threshold value based on the garbage collection information; and a write controller configured to control a latency of a response to a request received from a host based on the sustain information.

2. The memory controller of claim 1, wherein the write controller is configured to perform write throttling that delays the latency of the response in response to the memory device being in the sustain state.

3. The memory controller of claim 1, wherein the sustain detector is configured to generate the sustain information and provide the sustain information to a host whenever the garbage collection is performed.

4. The memory controller of claim 1, wherein the sustain detector is configured to determine whether the memory device is in the sustain state based on whether a check value is within a preset range, the check value being an average of valid page count values of the victim blocks.

5. The memory controller of claim 4, wherein the sustain detector is configured to determine that the memory device is in the sustain state in response to the check value being within the preset range that is greater than or equal to a first reference value and less than a second reference value.

6. The memory controller of claim 5, wherein the first reference value is a minimum value of valid page count values of victim blocks that are set in a manufacturing process, and the second reference value is a maximum value of the valid page count values of the victim blocks.

7. The memory controller of claim 1, wherein the sustain detector is configured to determine whether the memory device is in the sustain state based on a plurality of check values corresponding to a plurality of groups including different numbers of victim blocks, and each of the plurality of check values is an average of valid page count values of victim blocks belonging to a corresponding group.

8. The memory controller of claim 7, wherein the sustain detector is configured to determine that the memory device is in the sustain state in response to a standard deviation of the plurality of check values being less than or equal to a reference deviation.

9. The memory controller of claim 7, wherein the sustain detector is configured to determine that the memory device is in the sustain state in response to an error between each of the plurality of check values and an average of the plurality of check values being less than or equal to a reference error.

10. The memory controller of claim 7, wherein the sustain detector preferentially allocate a victim block having a valid page count value lower than that of another victim block among the victim blocks to the plurality of groups.

11. The memory controller of claim 1, wherein the sustain information indicates any one of the sustain state in which the garbage collection is being executed and the random write performance value is greater than or equal to the threshold value, a transition state in which the garbage collection is being executed and the random write performance value is less than the threshold value, and a no-transition state in which the garbage collection is not executed.

12. A method of operating a memory controller, the method comprising:

calculating, by the memory controller, valid page count values of victim blocks on which garbage collection is to be performed among a plurality of memory blocks included in a memory device;

performing the garbage collection on the victim blocks;

generating sustain information indicating whether a random write performance for the memory device is in a sustain state, based on valid page count values of the victim blocks;

providing the sustain information to a host; and performing write throttling that delays a latency of a response to a request received from the host when the memory device is in the sustain state.

13. The method of claim 12, wherein generating the sustain information comprises:

calculating a check value that is an average of the valid page count values of the victim blocks; and determining whether the memory device is in the sustain state based on whether the check value falls within a preset range.

14. The method of claim 13, wherein determining whether the memory device is in the sustain state comprises determining that the memory device is in the sustain state when the check value is greater than or equal to a first reference value and less than a second reference value as the preset range, the first reference value is a minimum value of the valid page count values of the victim blocks set in a manufacturing process of the memory device, and the second reference value is a maximum value of the valid page count values of the victim blocks set in the manufacturing process.

15. The method of claim 12, wherein generating the sustain information comprises:

allocating different numbers of victim blocks among the victim blocks to each of a plurality of groups; and determining whether the memory device is in the sustain state based on a plurality of check values corresponding to the plurality of respective groups, and each of the plurality of check values is an average of valid page count values of victim blocks belonging to a corresponding group.

16. The method of claim 12, wherein the sustain information indicates any one of the sustain state in which the garbage collection is being executed and a random write performance value related to a capability of the random write performance is greater than or equal to a threshold value, a transition state in which the garbage collection is being execute and the random write performance value is less than the threshold value, and a no-transition state in which the garbage collection is not executed.

17. A storage device, comprising:

a memory device including a plurality of memory blocks, each memory block including a plurality of pages configured to store data; and a memory controller in communication with the memory device and configured to select victim blocks on which garbage collection is to be performed among the plurality of memory blocks, calculate valid page count values of the victim blocks, generate sustain information indicating whether random write performance for the plurality of memory blocks is in a sustain state in which a random write performance value related to a capability of the random write performance is greater than or equal to a threshold value based on the valid page count values, and control a response latency of a request received from a host based on the sustain information.

18. The storage device of claim 17, wherein the memory controller is configured to provide the sustain information to the host.

* * * * *